US007933809B2

(12) United States Patent
Abraham et al.

(10) Patent No.: US 7,933,809 B2
(45) Date of Patent: Apr. 26, 2011

(54) METHOD, MEDIUM, AND SYSTEM FOR AUTOMATICALLY EMBEDDING INFORMATION CONCERNING ITEMS APPEARING IN VIDEO USING RFID TAGS

(75) Inventors: Subil M. Abraham, Plano, TX (US); Vinod A. Bijlani, Aundh, IN (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 11/611,958

(22) Filed: Dec. 18, 2006

(65) Prior Publication Data

US 2008/0143481 A1 Jun. 19, 2008

(51) Int. Cl.
*G06Q 30/00* (2006.01)
(52) U.S. Cl. ...................................... 705/26.1; 705/26.9
(58) Field of Classification Search .................... 705/26, 705/27
See application file for complete search history.

(56) References Cited

U.S. PATENT DOCUMENTS

| 6,608,563 | B2 | 8/2003 | Weston et al. |
| 6,998,987 | B2 | 2/2006 | Lin |
| 2004/0164858 | A1 | 8/2004 | Lin |
| 2005/0229227 | A1* | 10/2005 | Rogers .......................... 725/115 |
| 2006/0007304 | A1 | 1/2006 | Anderson |
| 2006/0028552 | A1 | 2/2006 | Aggarwal et al. |
| 2007/0188306 | A1* | 8/2007 | Tethrake et al. ........... 340/10.51 |

OTHER PUBLICATIONS

"Sponsored Feature: A Vision for RFID In-Store Consumer Observational Research," RFID News, Oct. 20, 2003.*
Kelly, "Alton Towers Visitors set for RFID Ride," Computing, Mar. 23, 2006, as viewed at IT Week.
Baard, "Artists Burnish RFID's Image," Wired News, Feb. 3, 2006.
"RFID-Enabled Make-Up Simulator," RFid Gazette, Feb. 13, 2006.
"Sponsored Feature: A Vision for RFID In-Store Consumer Observational Research," RFID News, Oct. 20, 2003.

* cited by examiner

*Primary Examiner* — Yogesh C Garg
*Assistant Examiner* — Matthew Zimmerman
(74) *Attorney, Agent, or Firm* — Patents on Demand, P.A.; Brian K. Buchheit; Scott M. Garrett

(57) ABSTRACT

The present solution can include a method for embedding information contained within a RFID tag into a video. A RFID tag can be loaded with item information specific to a product item. The RFID tag can then be attached to a physical item corresponding to the product item. While the physical item is being recorded, the RFID tag can be simultaneously scanned to obtain the item information automatically. The item information can then be embedded within the video at the time when the physical item is present. A user can view and interact with the generated video in a manner that permits the user to selectively view and/or otherwise utilize the embedded item information. For example, a user can opt to purchase an item appearing in the interactive video.

16 Claims, 6 Drawing Sheets

METHOD, MEDIUM, AND SYSTEM FOR AUTOMATICALLY EMBEDDING INFORMATION CONCERNING ITEMS APPEARING IN VIDEO USING RFID TAGS

BACKGROUND

1. Field of the Invention

The present invention relates to the field of video production and, more particularly, to automatically embedding information concerning items appearing in interactive video by using Radio Frequency Identification (RFID) tags.

2. Description of the Related Art

From silent films to documentaries, sitcoms to news broadcasts, visual media is a popular manner in which to capture and disseminate a variety of information. Whether to entertain or inform, a visual program often conveys more meaning than text or speech alone. This ability to include additional information to a visual story by means of color, costumes, props, and the expressions of actors intensifies the viewing experience and propagates the popularity of the video medium.

However, all of this information is subtle and meant to enhance the viewing experience. Attempts to add overt information to a video, that is information about the actual items being viewed in the video, have been haphazard at best. For example, commercial product placement in movies and television programming relays a specific brand name to the audience. A viewer is often unable to find information on a particular item viewed, such as how to purchase the sweater worn by a character in the program.

A variety of systems attempt to provide viewers with a means to purchase items viewed in a video program. For example, the HOME SHOPPING NETWORK produces television programming in which viewers can call into a call center to order the item being displayed in the program. However, this type of programming functions more like a visual catalog since the viewer cannot directly interact with the item in the video and must contact a third party. Other systems require additional hardware or the use of multiple interfaces to request product information and/or order an item. Such systems are cumbersome and not user-friendly. Since this type of system relies upon the timely communication between multiple components, a disruption to the communication lines creates order problems for users.

What is needed is a flexible video technology where product information can be embedded within a video that users can access through a simple interface to receive the product information and purchase the item. Ideally, this information would be presented in a transparent fashion, which would not distract a viewer from enjoying normal video content. That is, the product information can be relatively hidden, unless a user seeks it out.

SUMMARY OF THE INVENTION

The present invention can be implemented in accordance with numerous aspects consistent with material presented herein. For example, the present invention can include a method for embedding data contained within a RFID tag into a video. A RFID tag can be loaded with information specific to a product item. The RFID tag can then be attached to a physical item corresponding to the product item. While the physical item is included in a scene or area that is recorded on the video, the RFID tag can be simultaneously scanned to automatically obtain the item information. The item information can then be embedded within the video and associated with a time segment of the video when the physical item is present in a scene.

Another aspect of the present invention can include an e-commerce method for purchasing items appearing within a video. This method can begin when a video displaying device and its associated input mechanism receive a video with embedded item information. The video can then be visually presented within the display of the device. Next, an indicator indicating that information is available for an item can be presented within the video. Upon receiving user input from the input mechanism, the embedded item information can be displayed. An additional user selection can permit a user to purchase a selected item. The purchase information can automatically be sent from the device to a retail establishment. Accordingly, the item purchasing transaction can be completed by the user utilizing only the video displaying device and its input mechanism.

Yet another aspect of the present invention can include a system for embedding data contained within a RFID tag into video. This system can include a video capture system, a RFID scanning system, and a merge server. The video capture system can be configured to capture an area and turn that area into a viewing region of video. The RFID scanning system can be positioned proximate to the video capture system and can be configured to scan RFID tags located within the area. The merge server can be configured to automatically synchronize item information from the RFID tags and the video so that the item information is available for the items that appear in the viewing region. The resultant data-embedded video can be conveyed to a multitude of interactive video viewing devices, which can permit users to selectively view item information. Users can initiate e-commerce purchases for an item or request item information be sent via an electronic message using an input mechanism associated with the video viewing device, such as a TV remote control or a computer mouse.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention discloses a solution for providing sophisticated interactions involving items appearing within a viewing region of a video. For example, users can be allowed to selectively target items appearing within the video, which calls up additional information about these items. Until the user selection, this information can remain hidden so as not to distract the user. A user can be provided with a number of options related to the item, such as purchasing the item or receiving additional information about the item via an electronic message. The video interactions can occur using input mechanisms normally associated with the video viewing device. For example, when the video is viewed on a television, a remote control can be used to perform item specific operations. When the video is viewed on a computer, in-video items can be selected by pointing to them with an on-screen pointer, which can result in item specific options being presented to the user.

The solution's interactions can be enabled by associating Radio Frequency Identification (RFID) tags with items during a video production stage. That is, a series of RFID tags can be loaded with item specific information and attached to items. The items can appear in an area that is being captured by a video recordation device which generates video including a viewing region corresponding to the area. RFID scanners can determine a location of the RFID tags within the area and can automatically obtain the item information previously loaded on the RFID tags while the video recording device is operational. Data from the RFID scanners can be automatically merged and synchronized with a video from the recording device. At this time, area locations of the items can be translated into equivalent locations of the viewing region. The item specific data can be embedded within a file or stream that includes the video in such a way that time segments of the video area associated with item information for items appearing within a viewing region of those time segments. Accordingly, the interactive information can be automatically included within the video without excessive manpower requirements which encourages video producers to enable video for the aforementioned sophisticated interactions.

Figure 1:
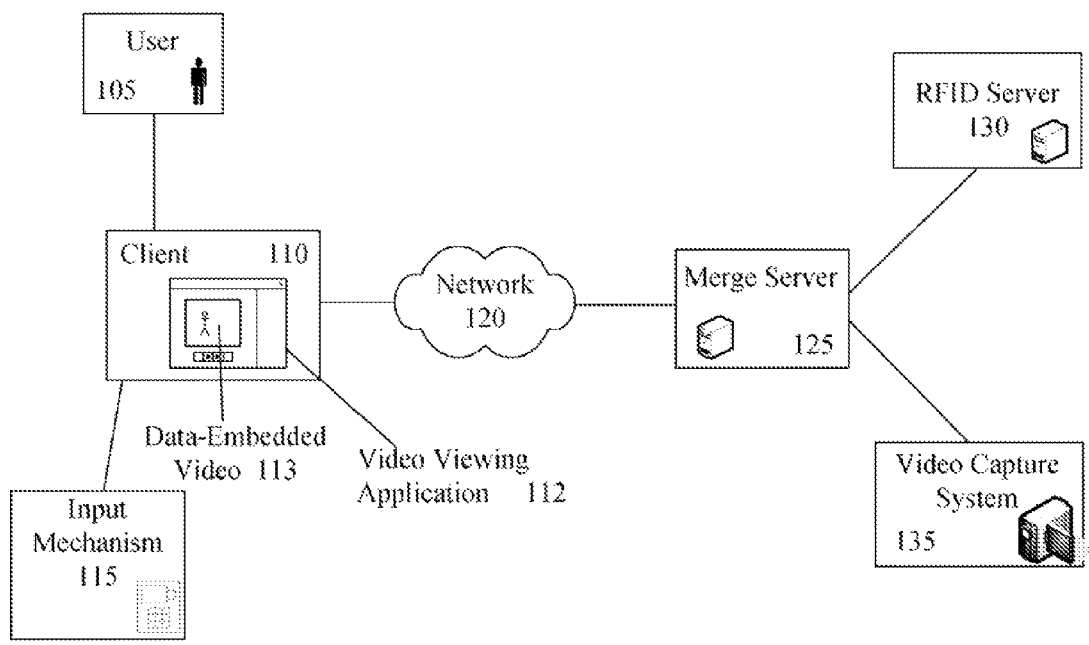
FIG. 1 is a schematic diagram illustrating a system for embedding information contained within a RFID tag into a video in accordance with embodiments of the inventive arrangements disclosed herein.

FIG. 1 is a schematic diagram illustrating a system 100 for embedding information contained within a RFID tag into a video in accordance with embodiments of the inventive arrangements disclosed herein. System 100 includes a client 110 that can be a personal computer, a television, a media player, or any other media viewing device or set of devices that are capable of presenting video, such as data-embedded video 113. The video viewing application 112 can include a hardware/software/firmware that enables the client 112 to present and interact with video 113. Further, viewing application 112 can include locally executing instructions, remotely executing instructions, and combinations thereof.

In system 100, a user 105 can view a data-embedded video 113 within a video viewing application 112 on client 110. The data-embedded video 113 can be transmitted to the client 110 over a network 120 from a merge server 125. In another contemplated embodiment, an intermediary server or device (not shown) can exist between the merge server 125 and the network 120 in order to store the data-embedded video 113 for transmission. For example, a Video on Demand data store can store video from the merge server 125 for display upon a television (client 110). In another example, a personal video recorder connected to client 110 can store video obtained from server 125 for playback at a time convenient for user 105.

Regardless of whether the video is streamed over network 120 to client 110 or cached in a recording device and then presented upon client 110, the user 105 can interact with the elements in the data-embedded video 113. Interactions can be through an input mechanism 115 associated with the client 110. For example, when the client is a television, the input mechanism 115 can be a remote control or an input pad on the television itself. When the client 110 is a computer, the input mechanism 115 can be a mouse, a keyboard, or other such peripheral.

The video viewing application 112 can be constructed so that it is able to run on the client 110 and accept input from input mechanism 115. The application 112 can be implemented in software, hardware, or firmware. It can also be executed from within client 110 or be executed in an external device or module linked to client 110. For example, the video viewing application 112 can be a software application or browser plug-in which the video 113 is displayed upon a computing device (client 110). In another example, the application 112 can be included within firmware of a set-top box which interfaces with a television (client 110).

The merge server 125 can be a computing server that includes computer software and algorithms to create a data-embedded video 113. The software and algorithms of the merge server 125 can embed the information received from the RFID server 130 into the video received from the video capture system 135, resulting in a data-embedded video 113. The merge server 125 can receive the data from the video capture system 135 and RFID server 130 in real-time or can be provided prerecorded data for a delayed merge. In another embodiment, the merge server 125 can include a data store (not shown) to store received data to merge later.

The merger server 125 can utilize any of a variety of image processing technologies to synchronize the RFID sensor 130 information and the video of system 135. The exact technology utilized for this synchronization is not central to the solution of system 100, and system 100 is not to be construed as limited in this regard.

In one embodiment, for example, video capture system 135 can be calibrated for a region so that one or more points of a viewing region generated by system 135 have known relative coordinates that correspond to a physical area being recorded. These coordinates can be used to translate physical area coordinates associated with the RFID tagged items to viewing region coordinates.

In another embodiment, a reference RFID tag can be placed within an area from which a viewing region is generated. Relative positions in the viewing area can be automatically determined from the reference tag. The merge server 125 can optionally use video editing technologies, to edit out the reference RFID tag from the viewing region so that it does not visibly appear in the viewing region.

In still another embodiment, images of the tagged items can be included within the information that is loaded into the RFID tags read by server 130. These images can be compared against images contained within video. When matches are automatically determined by video comparison algorithms, the merge server 125 can associate the item information from the RFID tags with matching video regions and/or video time segments.

The video capture system 135 can include a multitude of components for the production of a video, such as cameras, microphones, computing devices and their software, and the like. The components of the video capture system 135 can utilize a variety of and intermixing of technologies, such as analog and digital recording devices. Additionally, the raw video created by the video capture system 135 can be further processed before being sent to the merge server 125. For example, the raw video recording of a television sitcom can be edited and refined prior to being sent to the merge server 125 to have data embedded within it.

Network 120 can include any hardware/software/and firmware necessary to convey data encoded within carrier waves. Data can be contained within analog or digital signals and conveyed though data or voice channels. Network 120 can include local components and data pathways necessary for communications to be exchanged among computing device components and between integrated device components and peripheral devices. Network 120 can also include network equipment, such as routers, data lines, hubs, and intermediary servers which together form a data network, such as the Internet. Network 120 can also include circuit-based communication components and mobile communication components, such as telephony switches, modems, cellular communication towers, and the like. Network 120 can include line based and/or wireless communication pathways.

Figure 2:
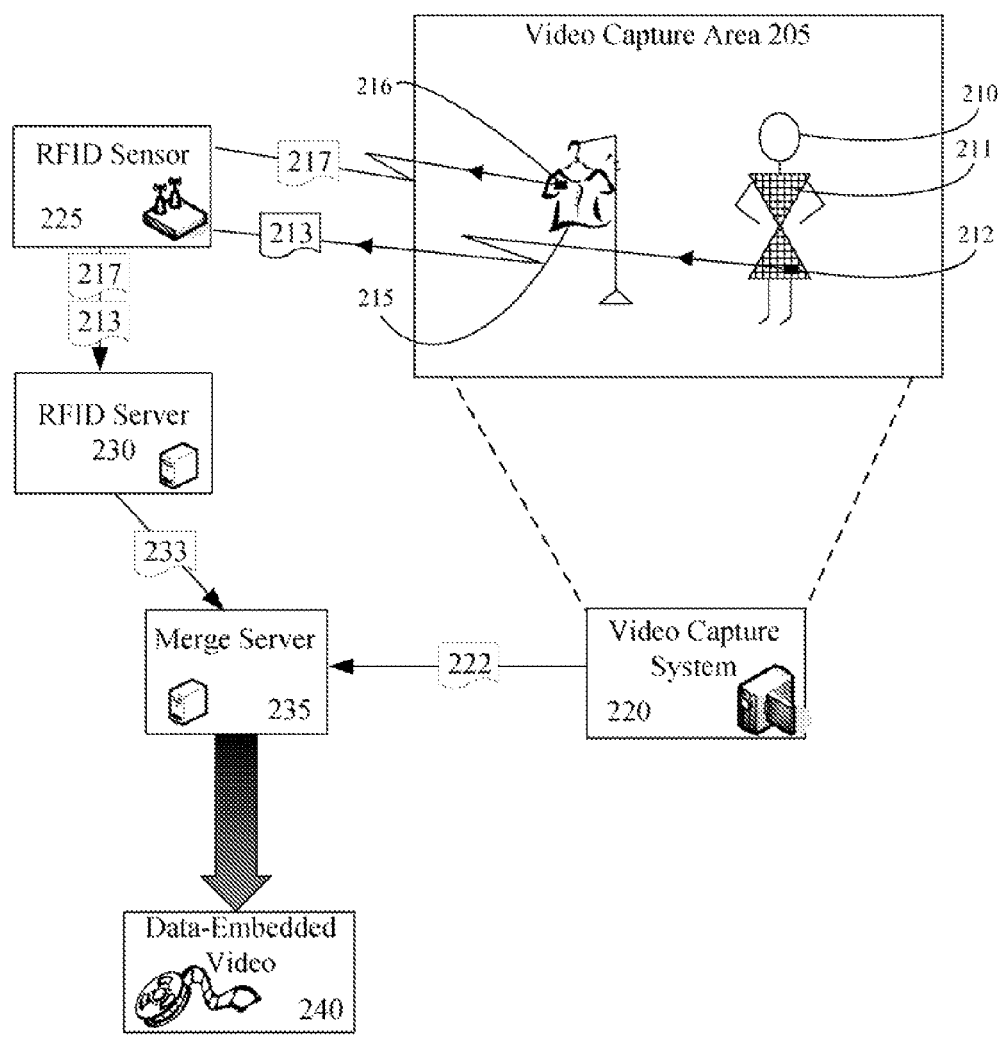
FIG. 2 is a schematic diagram illustrating a system for capturing information contained within a RFID tag linked to an item for embedding into a video region associated with that item in accordance with an embodiment of the inventive arrangements disclosed herein.

FIG. 2 is a schematic diagram illustrating a system 200 for capturing information contained within a RFID tag linked to an item for embedding into a video region associated with that item with an embodiment of the inventive arrangements disclosed herein. System 200 can be an extension to system 100. System 200 is not limited in this regard, however, and can be performed in the context of any system supporting the capturing of RFID tag information for embedding within a video.

In system 200, the video capture system 220 can be set up to record a video capture area 205, which results in a corresponding viewing region for the generated video. The video capture system 220 can do so through a variety of means, including, but not limited to, camera-controlling software, manual operation, and the like. The video 222 produced by the video capture system 220 can be conveyed to the merge server 235 for data embedding.

Product items 211 and 215 can be placed within the video capture area 205 so that they may be videoed. Additionally, the product items 211 and 215 can contain RFID tags containing information pertaining to the specific product item. In this example, RFID tag 212 contains information for and is attached to product item 211, just as RFID tag 216 contains information for and is attached to product item 215. It should be appreciated that the RFID tags 212 and 216 can be attached to product items 211 and 215 in a variety of ways that are independent to the functionality of the overall system 200.

Product items 211 and 215 can be any of a variety of objects that can be placed within the video capture area 205 and recorded by video capture system 220. Additionally, the product items can be videoed statistically or placed on a moving model 210 and videoed while in motion. The recorded images of the product items 211 and 215 can appear in the resultant video 222.

The RFID sensor 225 can detect the signals of the RFID 212 and 216 of the product items 211 and 215, respectively. Additionally, the RFID sensor 225 can receive information from the RFID tags 212 and 216. In this example, the RFID sensor 225 receives data item 213 from RFID tag 212 and data item 217 from RFID tag 216. The data items 213 and 217 can include product information, such as pricing, an item serial number, one or more retailers selling the item, and the like. A location of the tag within the video capture area 205 can be automatically determined by triangulating a position of the RFID tag based upon input from a plurality of RFID sensors 225.

The RFID sensor 225 can pass the data items 213 and 217 to the RFID server 230. The RFID server 230 can merge the locations and associated information for all tags for a specified time reference. This can be achieved by creating a grid mapping 233 of the location of tags with their associated information for the specified time reference. The grid mapping 233 can then be passed to the merge server 235 for synchronization with the video 222.

Upon receipt of the video 222 from the video capture system 220 and the RFID location and data grid mapping 233, the merge server 235 can begin embedding the information within the video. For a specified time reference, the received grid mapping 233 can have the video 222 for the corresponding time reference overlaid upon it. The region of the video 222 that is overlaid over RFID information can be identified in the video frame header. It should be appreciated that this step can allow for the implementation of a search feature, by which a video can be searched for scenes containing a specified product.

The merge server 235 can produce a data-embedded video 240 by inserting the product information from the grid mapping 233 into the video 222. This process can result in a frame of the data-embedded video 240 containing a header section, a video portion, an audio portion, and a product information portion.

Figure 3:
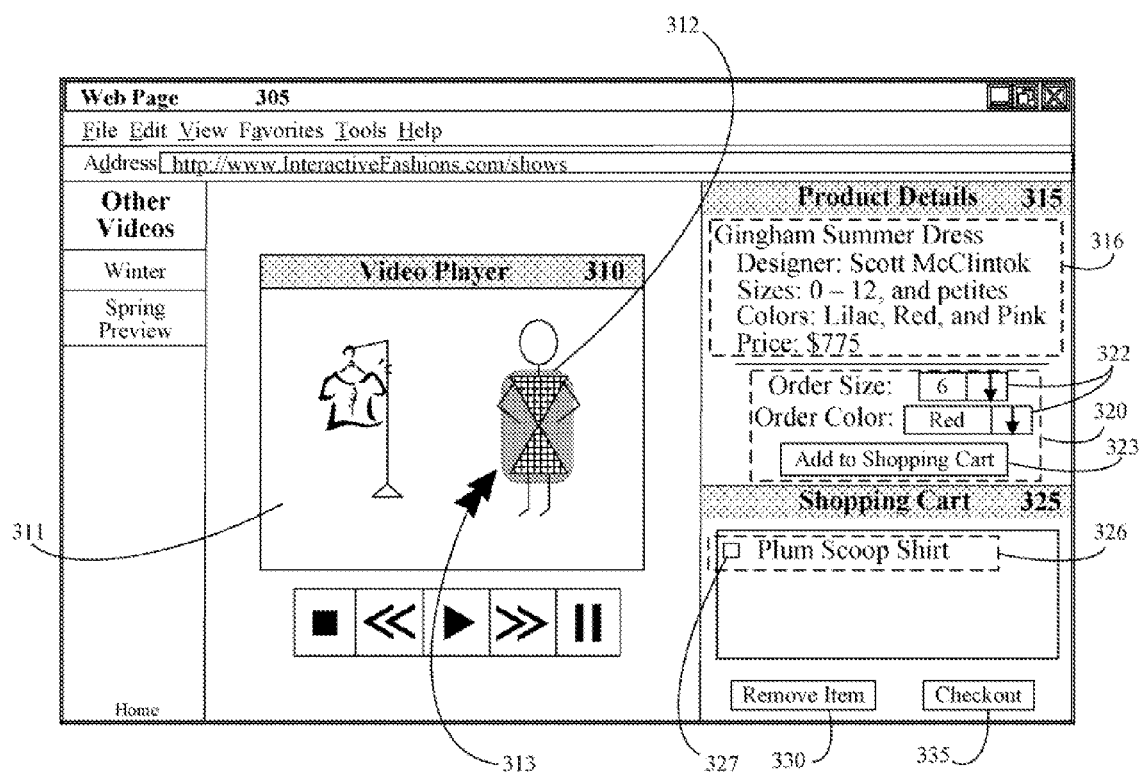
FIG. 3 is an illustration of a Web page for user interaction with a video embedded with RFID tag information in accordance with an embodiment of the inventive arrangements disclosed herein.

FIG. 3 is an illustration of a Web page 305 for user interaction with a video embedded with RFID tag information in accordance with an embodiment of the inventive arrangements disclosed herein.

A user can view a data-embedded video 311 in a video player 310 contained within Web page 305. The data-embedded video 311 can include a data indicator 312 to alert a user that an item has information associated with it. In this example, the data indicator 312 is visual and represented by a change in background color around the product item. The data indicator 312 can also be implemented in a variety of other manners, including, but not limited to, an audio alert, a pop-up window, a fly-over window, and the like. Additionally, the data indicator 312 can include a combination of multiple methods, such as a specific audio alert coupled with a change in color around the product item. In another embodiment, the data indicator 312 can be used to alert a user when a user-specified object appears in the video.

A user can elect to select the indicated product item with a selector 313. This selector 313 can have a visual representation, as with the arrow shown in the example. Additionally, the selector 313 can trigger a data indicator 312 when placed over a product item that has embedded information.

The selection of a product item with embedded information can display the product information 316 embedded within the Web page 305, such as in a product details area 315. Alternately, the product details area 315 can appear outside of Web page 305, as in a pop-up or fly-over window or a separate Web page.

In addition to product information 316, the product details area 315 can include controls 320 for ordering the selected product item. The controls 320 can include selectors 322 and add button 323. The selectors 322 can allow a user to specify conditions pertinent to ordering, such as desired size and color as shown in this example. Additionally, the selectors 322 can be implemented in any manner compatible with the technology of the overall system and Web site.

The add button 323 can identify the selected product item and selections designated in the selectors 322 with a user's electronic shopping cart. The contents of the user's electronic shopping cart can be displayed within the Web page 305 in shopping cart area 325. Alternately, the shopping cart area 325 can appear outside of Web page 305, as in a pop-up or fly-over window or a separate Web page.

The shopping cart area 325 can display all selected product items that have been added by the user. A listed item 326 can include an item selector 327. In this example, the item selector 327 is represented by a selectable check box. A user can select the item selector 327 of a listed item 326 in order to use the remove button 330. Alternately, the shopping cart area 325 can implement the removal of a listed item 326 through a means that does not require an item selector 327, such as a right-click menu option. Selection of the checkout button 335 by a user can initiate the ordering process for the remaining product items listed within the shopping cart area 325.

It should be appreciated that the interactions shown for Web page 305 are illustrative in nature and are not intended to be comprehensive. In a different embodiment (not shown), interactions can be more sophisticated. For example, a user can be allowed to specify items of interest using a GUI associated with the video player 310. Some of these specifications can take the form of simple rules. For instance, a user provided rule can allow a user to specify that he/she is interested in combinations of women's apparel that include a red hat and a blue dress. A search engine linked to the video player 310 can store the user specifications and/or rules in a database and can alert a user when a frame containing a desired item or set of items is displayed. Because the search engine has access to data embedded in the video, a quick search of this embedded data can be routinely and quickly performed.

In another example, metrics related to user viewing habits, purchasing habits, items of interest, and the like can be automatically recorded. This information can be used to create automatic rules related to the user's interests. These automatic rules can operate in much the same manner as the user provided rules discussed above.

In a related extension of the above, user search criteria can be applied to numerous popular broadcasts or other video sources, whether the user has chosen to watch a related video broadcast or not. For example, a user can be watching a sitcom on one television channel, when a different channel broadcasts a drama that contains video matching the user's criteria. A recording device can automatically record a relevant portion of the drama as well as the embedded data for later user consideration.

Similarly, a number of online Web stores associated with data-embedded video can be automatically searched for items matching the user's specifications. A user can be presented with those items most closely matching their criteria. This type of search provides a potential new direct marketing channel related to video player 310 and data embedded video.

Figure 4:
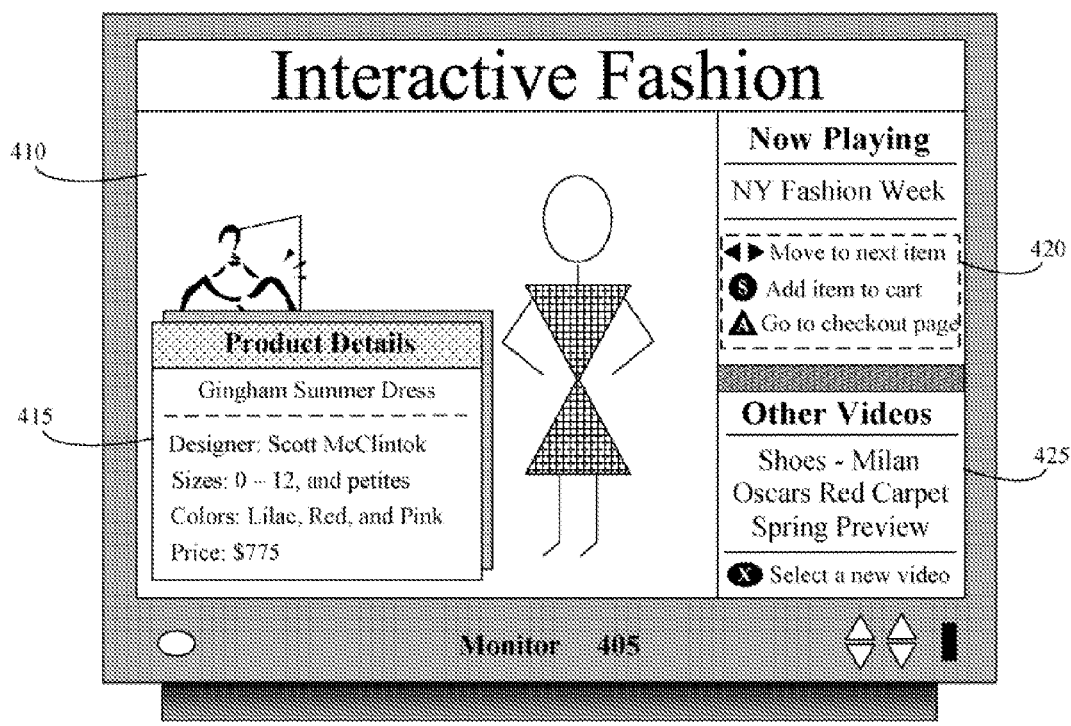
FIG. 4 is an illustration of a video monitor interface for user interaction with a video embedded with RFID tag information in accordance with an embodiment of the inventive arrangements disclosed herein.
Figure 4:
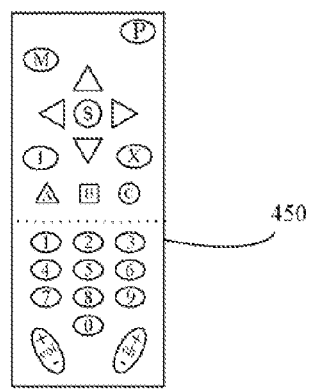

FIG. 4 is an illustration of a video monitor interface 400 for user interaction with a video embedded with RFID tag information in accordance with an embodiment of the inventive arrangements disclosed herein.

The monitor 405 can display video 410 within an environment that simulates the viewing application 112 of system 100. Alternately, the video 410 can be viewed on monitor 405 in the same manner as other programming, such as television programming, cable programming, satellite programming, ON-DEMAND movies, and the like.

Selection of a product item with embedded information by a user with the remote control 450 can trigger the display of the product details window 415. The product details window can display the information embedded within the video 410 for the selected product items. This window 415 can remain visible for a set amount of time or until a user makes another selection.

Additionally, a product information indicator that informs a viewer that product information exists can follow the selected product item should the product item move within the video 410. For example, the item can be set to "flash" or a selection item, such as a number (1) for selecting the item via control 450 can follow the item as it moves in the video 410. Behavior of a product information indicator can be configured by a user, so that the indicators do not distract the user from the displayed video.

The monitor 405 can also display user-selectable controls 420. These controls 420 can correspond to button available on the remote control 450 and provide a variety of functionality. In this example, the controls 420 can allow a user to navigate selectable items, add a selected item to a shopping cart, and proceed to a checkout page. It should be appreciated that the listed controls need to correspond to buttons available on the remote control 450 that is specifically associated with the monitor 405 or to buttons that are generally available on a variety of remote control models in order to ensure functionality.

The monitor 405 can also display additional videos for viewing in an available video listing 425. It should be appreciated that both the controls 420 and the available video listing 425 can be hidden until selected by a user in order to provide full-screen viewing of the video 410. Additionally, controls 420 can be included for the removal of these areas from the viewing area.

Figure 5:
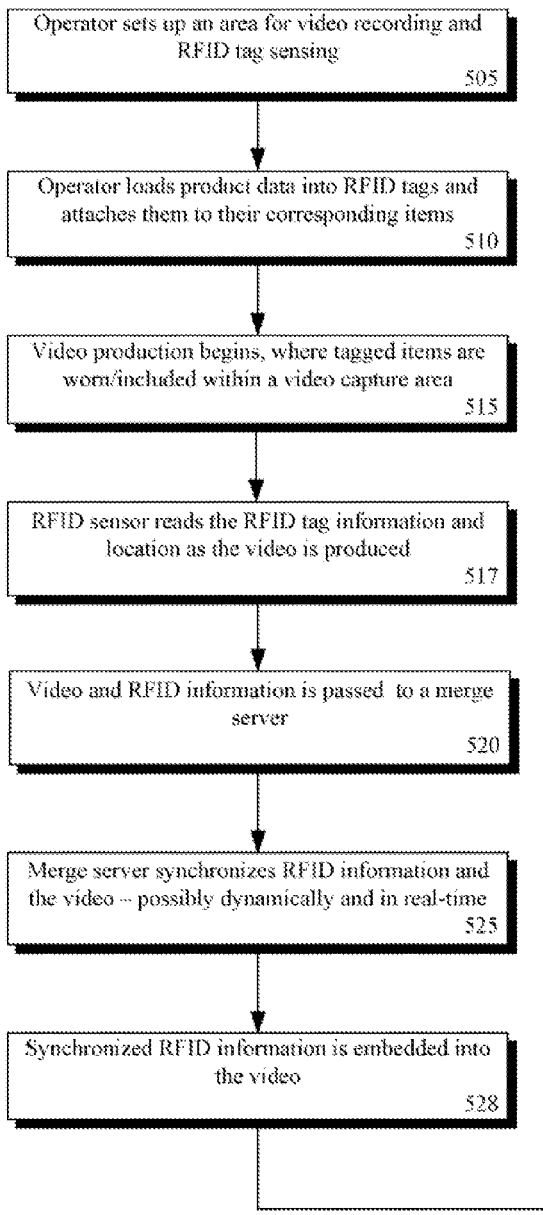
FIG. 5 is a flow chart of a method for capturing information contained within a RFID tag linked to an item for embedding into a video region associated with that item in accordance with an embodiment of the inventive arrangements disclosed herein.
Figure 5:
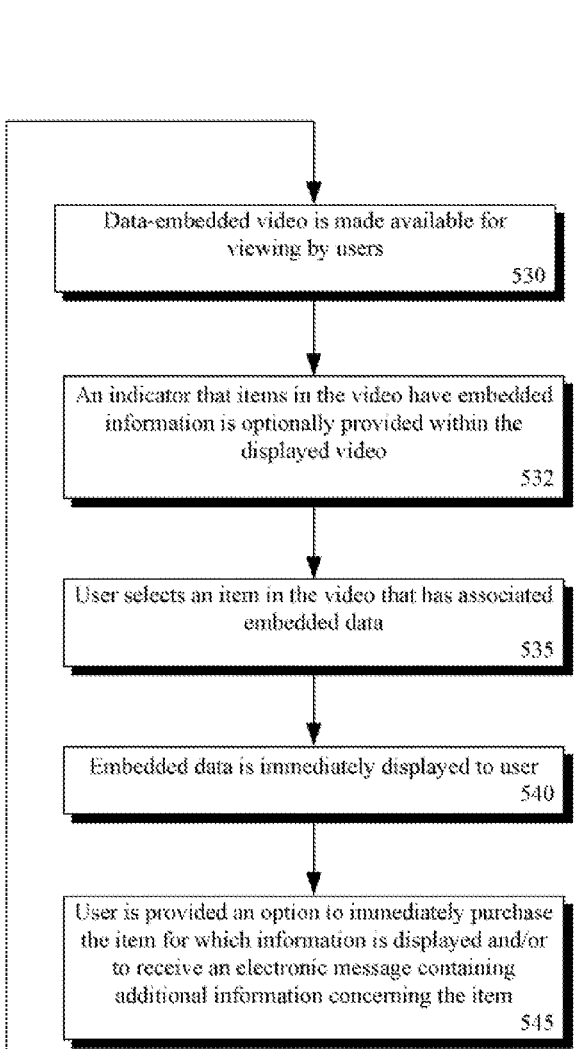

FIG. 5 is a flow chart of a method 500 for capturing information contained within a RFID tag linked to an item for embedding into a video region associated with that item in accordance with an embodiment of the inventive arrangements disclosed herein. Method 500 can be performed in the context of systems 100 and/or 200.

Method 500 can begin in step 505 where an operator sets up an area for video recording and the sensing of RFID tags. This step can include the installation and configuration of the video capture system 135 of system 100 or the video capture system 220 of system 200, as well as the RFID sensor 225 and RFID server 230 of system 200.

In step 510, the operator can load the RFID tags with product data and can attach the tags to their corresponding items. Then, video production can begin in step 510, where the tagged product items are worn and/or included in the video capture area.

While the tagged items are being videoed, one or more RFID sensors can receive the loaded information from the tags as well as determine a location of each of the tags, as indicated by step 517. In step 520, the video and RFID information can be passed to a merge server. The merge server can synchronize the RFID information and the video in step 525.

It should be appreciated that step 525 can occur dynamically and in real-time in regard to the videoing of the tagged items.

In step 528, the merge server can embed the RFID information into the video. The data-embedded video can be made available to users in step 530. Step 532 can optionally occur where an indicator is provided to alert users that an item has embedded information associated with it. It should be appreciated that embedding the information in the video does not necessarily mean the information is all contained in a single video stream or file. Instead, multiple different streams and/or files can be used that together comprise the "embedded video." However formed, the embedded video needs to include synchronization information that links the item information to images appearing within the video.

In step 535, a user can select an item in the video that has embedded information associated with it. Step 540 can immediately occur to display the embedded information to the user. In step 545, the user can be provided with an option to immediately purchase the selected items or receive an electronic message containing additional information. Additional options and interactions are possible, and the invention is not limited to purchasing items or to receiving information concerning items.

Figure 6:
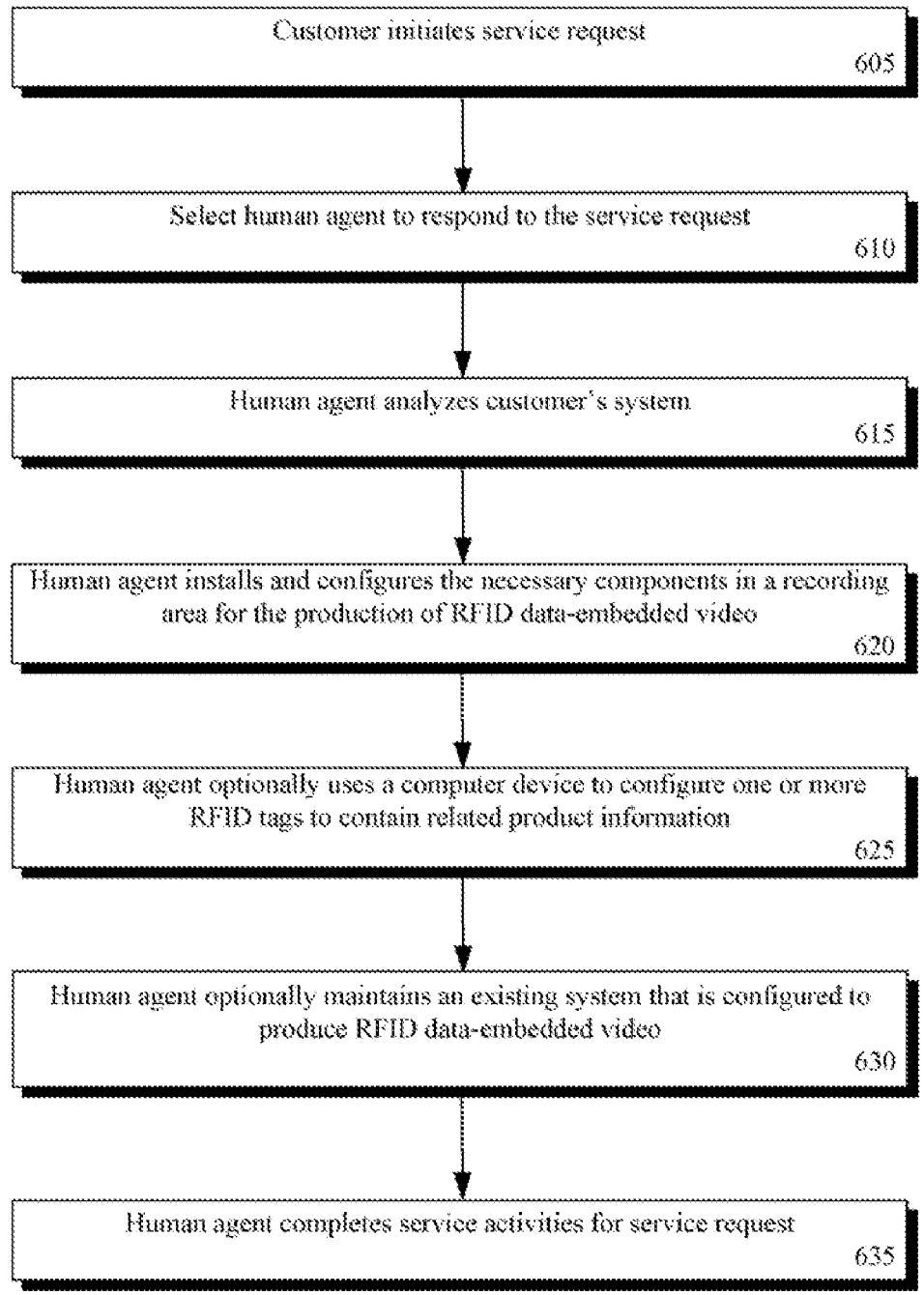
FIG. 6 is a flow chart of a method where a service agent can configure an interactive video system containing RFID obtained information in accordance with an embodiment of the inventive arrangements disclosed herein.

FIG. 6 is a flow chart of a method 600 where a service agent can configure an interactive video system containing RFID obtained information in accordance with an embodiment of the inventive arrangements disclosed herein. Method 600 can be performed in the context of system 100 and/or 200.

Method 600 can begin in step 605, when a customer initiates a service request. The service request can be a request for a service agent to establish a new system for embedding RFID tag information into a video. The service request can also be a request to troubleshoot a problem with an existing system for embedding RFID tag information into a video.

In step 610, a human agent can be selected to respond to the service request. In step 615, the human agent can analyze a customer's current system and can develop a solution. The solution can result in system 100 or any system configured to capture information contained within a RFID tag on an object to embed within a video of that object, such as a system that performs the steps of method 500.

In step 620, the human agent can configure the customer's system to capture information contained within a RFID tag on an object to embed within a video of that object. This can include the installation of a video capture system, a RFID sensor, RFID server, and merge server. In step 625, the human agent can optionally use a computer device to configure one or more RFID tags to contain product information.

In step 630, the human agent can optionally maintain an existing system that is configured to produce RFID data-embedded video for the customer. In step 635, the human agent can complete the service activities.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for embedding data contained within a RFID tag into a video comprising:

loading item information specific to a product item into a memory space of an RFID tag, wherein the item information includes a price of the product item or one or more retailers selling the product item;

attaching the RFID tag to a physical item corresponding to the product item;

recording video of an area, said area including said physical item;

scanning the RFID tag to automatically obtain the item information;

embedding the item information, obtained from the scanning of the RFID tag, into the video, wherein the item information is associated with a time segment of the video during which the physical item is within the area; and creating a display that includes the video with the embedded item information and further includes an interactive portion having controls to facilitate the purchase of the physical item according to the embedded item information.

2. The method of claim 1, further comprising:

visually presenting the video within a display of a device; and selectively displaying the item information in the display responsive to input provided via an input mechanism associated with the device.

3. The method of claim 2, further comprising:

receiving user provided input via the input mechanism to purchase said item; and responsive to the purchase input, permitting the user to purchase the item.

4. The method of claim 3, wherein the device is a television, wherein the input mechanism is a remote control.

5. The method of claim 3, wherein the device is a computer, and wherein the input mechanism is at least one of a mouse, a touchpad, a keyboard, a trackball, a pointing stick, and a touch screen.

6. The method of claim 2, further comprising:

receiving a user provided input via the input mechanism to receive item information via an electronic message; and responsive to the information input, automatically sending an electronic message to a user accessible location.

7. The method of claim 1, further comprising:

automatically determining a location of the item within the area by determining a location of the RFID tag; and ascertaining a location in a viewing region of the video that corresponds to the determined location of the item, wherein the embedded item information includes this ascertained location.

8. The method of claim 7, wherein the recording, scanning, determining, ascertaining, and embedding steps occur automatically for the duration of the video and occur in at least one of real-time and near real-time.

9. The method of claim 7, wherein a plurality of items associated with RFID tags continuously enter and exit the area during the duration, wherein the steps of claim 1 apply to each of the plurality of item, and wherein the recording, scanning, determining, ascertaining, and embedding steps occur automatically.

10. The method of claim 2, further comprising:
storing user specifications for items of user interest in a database; and
a search engine linked to the device alerting the user via the device that the visually presented video contains a product item satisfying the user specifications.

11. The method of claim 7, further comprising:
visually presenting the video within a display of a device;
visually presenting a moving indicator within the video that corresponds to the item location within the viewing region; and
selectively displaying the item information in the display responsive to input provided via an input mechanism associated with the device.

12. The method of claim 11, further comprising:
receiving user provided input via the input mechanism to purchase said item; and
responsive to the purchase input, permitting the user to purchase the item.

13. The method of claim 2, further comprising:
computing equipment automatically recording metrics relating to user viewing habits, purchasing habits, and items of interest;
computing equipment creating automatic rules relating to the users interest from the recorded metrics; and
a search engine linked to the device alerting the user via the device that the visually presented video contains a product item satisfying one of the automatic rules.

14. A system for embedding data contained within a RFID tag into video comprising:
a video capture system configured to capture an area and turn that area into a viewing region of video;
a RFID scanning system positioned proximate to the video capture system, said RFID scanning system configured to scan RFID tags located within the area, wherein the RFID tags are attached to items appearing in the viewing region and are loaded with item information, wherein the item information includes a price of the item or one or more retailers selling the item; and
a merge server configured to automatically embed the item information within the RFID tags into the video at a time synchronized with when the items appear in the viewing region, wherein the item information is retrieved by the merge server scanning the RFID tags using the RFID scanning system;
one or more computer processors configured to create a display that includes the video with the embedded item information and further includes an interactive portion having controls to facilitate the purchase of the item according to the embedded item information.

15. The system of claim 14, wherein a position of the items in the area are automatically determined based upon information obtained from the RFID scanning system, wherein the merge server automatically and dynamically ascertains positions of the items within the viewing region based upon the determined positions of the items in the area, and wherein the ascertained positions within the viewing region are included as part of the synchronized item information that is conveyed to the interaction video viewing devices.

16. A tangible computer readable medium comprising instructions which when executed by one or more computer processors cause the one or more computer processors to perform the following steps:
loading item information specific to a product item into a memory space of an RFID tag, wherein the item information includes a price of the product item or one or more retailers selling the product item;
associating the RFID tag with a physical item corresponding to the product item;
recording video of an area, said area including said physical item;
scanning the RFID tag to automatically obtain the item information; and
embedding the item information, obtained from the scanning of the RFID tag, into the video, wherein the item information is associated with a time segment of the video during which the physical item is within the area;
creating a display that includes the video with the embedded item information and further includes an interactive portion having controls to facilitate the purchase of the physical item according to the embedded item information.

* * * * *